No. 702,347. Patented June 10, 1902.
J. M. DODGE & A. D. SHAW.
FEEDING MECHANISM FOR CONVEYERS.
(Application filed Dec. 13, 1900.)
(No Model.)
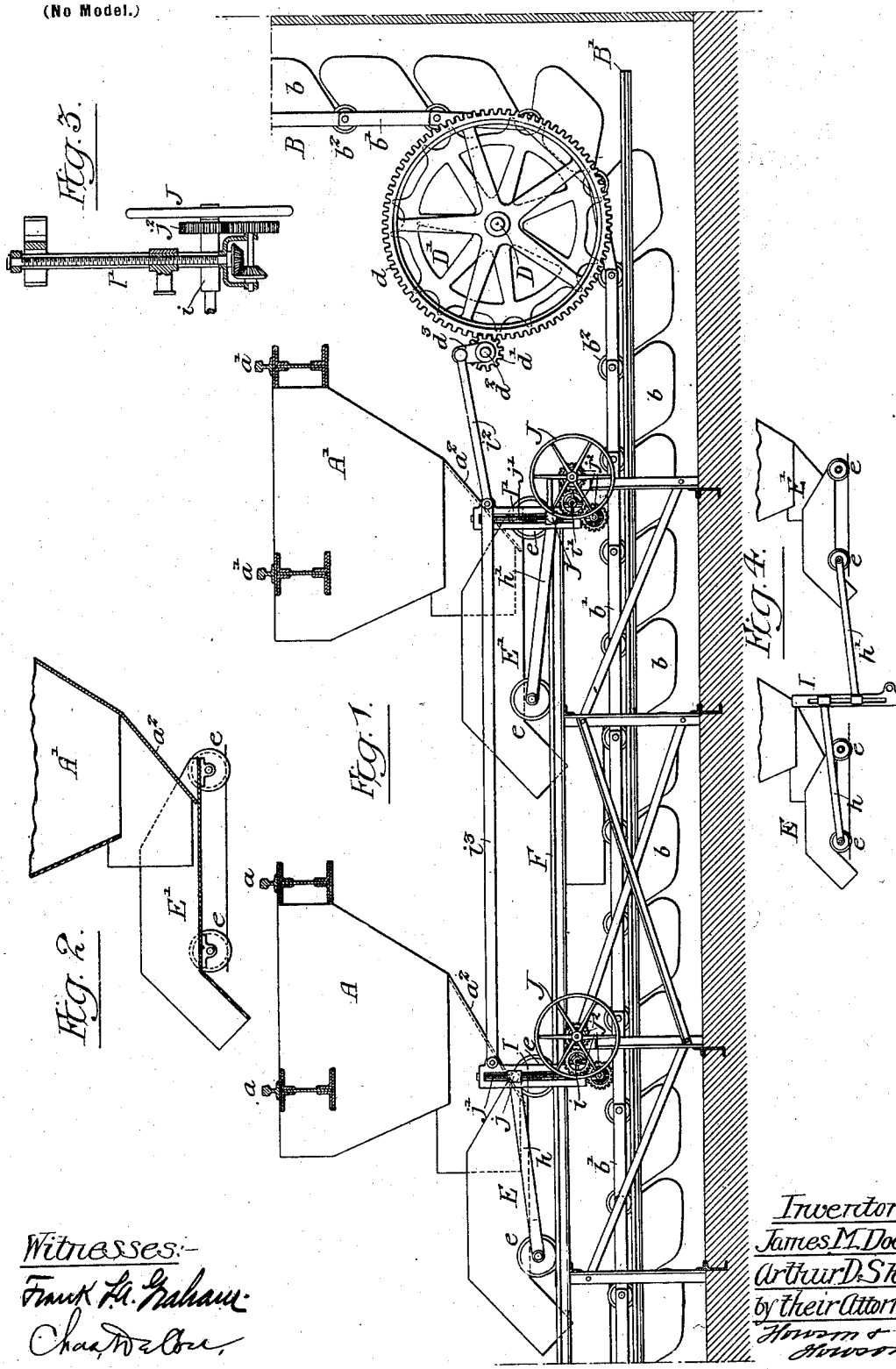
Witnesses:—
Inventors:—
James M. Dodge
Arthur D. Shaw
by their Attorneys

UNITED STATES PATENT OFFICE.

JAMES M. DODGE AND ARTHUR D. SHAW, OF PHILADELPHIA, PENNSYLVANIA, ASSIGNORS TO THE LINK BELT ENGINEERING COMPANY, OF PHILADELPHIA, PENNSYLVANIA, A CORPORATION OF PENNSYLVANIA.

FEEDING MECHANISM FOR CONVEYERS.

SPECIFICATION forming part of Letters Patent No. 702,347, dated June 10, 1902.

Application filed December 13, 1900. Serial No. 39,762. (No model.)

*To all whom it may concern:*

Be it known that we, JAMES M. DODGE and ARTHUR D. SHAW, citizens of the United States, and residents of Philadelphia, Pennsylvania, have invented certain Improvements in Feeding Mechanism for Conveyers, of which the following is a specification.

The object of our invention is to provide an apparatus for mixing two or more different materials during the passage from the hoppers or bins to the point of discharge.

By our invention we are enabled to dispense with separate mixing apparatus and at the same time provide for the thorough mixing of the materials.

Our invention is especially applicable for mixing bituminous with anthracite coal for use in steam-boiler furnaces.

It has been found by recent experiments that the mixing of anthracite and bituminous coal in certain proportions is a decided advantage over the use of either as a fuel under steam-boilers; but there has been difficulty in properly mixing the two materials so as to obtain the best possible results. By our invention we can mix the materials without providing extra mixing apparatus and as the material is conveyed from the hopper or bin to the point of discharge.

In the accompanying drawings, Figure 1 is a view of sufficient of our improved apparatus to illustrate our invention. Fig. 2 is a sectional view of the feeding-carriage. Fig. 3 is a view of one of the levers, showing the adjusting mechanism for the block; and Fig. 4 is a view of a modification of our invention.

A A' are two hoppers or bins.

$a\ a$ are rails mounted on beams above the hopper A, and $a'\ a'$ are rails mounted on beams above the hopper A', so that a car can be traversed on either track and its contents discharged directly into a hopper. If it is desired to mix anthracite and bituminous coal, for instance, the hopper A may contain the anthracite coal and the hopper A' the bituminous coal.

B is the conveyer, made up of buckets $b$, connected together by links $b'$. $b^2\ b^2$ are the wheels, which traverse the track B' to the point of discharge. The buckets can be of any shape desired, according to the type of conveyer used, and the conveyer is of the endless type, the return run in the present instance returning with the buckets empty.

D may be the driving-shaft of the conveyer, having wheels D' engaging the conveyer-chain, as shown, and on this shaft D is a gear-wheel $d$, which meshes with a pinion $d'$ on a crank-shaft $d^2$, having a crank $d^3$, which is connected to the operating mechanism of the discharge-carriages, described hereinafter.

Each hopper A in the present instance is open in front, having an inclined bottom $a^2$, which extends to the platform of the carriage E. Wheels $e\ e$ support the carriage on the track F. The carriage E' for the hopper A' is similar to the carriage E.

I I' are two levers pivoted at $i\ i'$, respectively, to a suitable fixed frame. The lever I' is connected by a rod $i^2$ to the crank $d^3$ on the shaft $d^2$, and the two levers I I' are connected together by a rod $i^3$, so that both levers are moved a given distance as the crank-shaft $d^2$ is revolved. The carriage E' is connected to the lever I' by a rod $h'$, and the carriage E is connected to the lever I by a rod $h$, so that as the levers are moved on their pivots the carriages E E' will be reciprocated under their respective hoppers. In order to alter the movement of the carriages so as to feed more or less material from the hoppers to the buckets, we pivot each arm connecting the carriage to the lever to a block $j$, mounted in a slot in the lever, and this block is controlled by a vertical screw $j'$, which is geared to a hand-wheel J through a train of gears $j^2$. This construction is the same on the lever I' as on the lever I, so that either one of the blocks J can be moved from or toward the fulcrum of its lever to increase or diminish the extent of movement of the carriage, and consequently to increase or diminish the amount of material fed to the buckets. By the arrangement of gearing above described the block can be adjusted on its lever while the apparatus is in motion, and by extending the slot past the pivot the block can be adjusted so as to have practically no movement when it is desired to stop the feed.

We have shown in Fig. 4 a modification in which one of the levers is dispensed with, the two carriages being connected to a single lever. The blocks on this lever may be independently adjustable or the connections may be fixed.

In the drawings we have shown the hopper A for anthracite coal, for instance, and the hopper for A' for bituminous coal, and it will be noticed that the block $j$ on the lever I is farther away from the pivot-point $i$ than the block $j$ on the lever I'. Consequently the carriage E will move a greater distance than the carriage E', and consequently more material will be discharged from the hopper A than from the hopper A'.

By the construction above described we can not only regulate the feed of the material, but can also regulate the discharge apparatus according to the character of the material, as it will be understood that one material will flow more readily than another. In the case of coal, for instance, anthracite coal will flow at a less angle than bituminous coal, and consequently the movement of the carriages must compensate for this difference in materials. It will be noticed also that the bottom $a^2$ of the hopper A' is in the present instance at a steeper angle than the bottom of the hopper A, and the angle of the bottom of each hopper may be varied, depending upon the material to be mixed and conveyed.

The operation of the apparatus is as follows: The conveyer is traversed continuously in the present instance under the two carriages E E'. These carriages are reciprocated under the hoppers A and A'. If, for instance, bituminous and anthracite coal are to be mixed, the hoppers are filled from cars in the present instance or from conveyers, and the blocks $j$ are so set on the arms I I' as to give each carriage the desired movement, so as to either feed the material from each hopper in even quantities or feed from one hopper more material than from the other, according to the mixture desired. As the conveyer passes under the carriage E' bituminous coal will be discharged into one of the buckets. Then as the bucket is moved forward, so as to be under the carriage E, the said carriage will discharge into it a certain amount of anthracite coal, so that the bucket will contain a percentage of anthracite and a percentage of bituminous coal. The bucket is then carried to the point of discharge, dumped into a pile, or conveyed directly to bins or stokers; but as one bucket is discharged upon another the coal will be thoroughly mixed and ready for immediate use. It will be understood that the movement of each carriage is timed with the movement of the conveyer, so that the carriages, as they are intermittently discharged, will discharge only when the bucket is in position to receive the charge. Where a flight conveyer is used or a bucket conveyer in which the joint between the buckets is protected, this care need not be exercised.

It will be understood that where more than two materials are to be mixed additional hoppers and discharge-carriages may be used.

We claim as our invention—

1. The combination of a conveyer, two hoppers mounted above the conveyer, a positively-driven discharge device for each hopper mounted clear of the conveyer, and means for operating the discharge devices in unison so as to feed a certain proportion of material from each hopper into the conveyer and thereby mixing the same, substantially as described.

2. The combination of an endless bucket conveyer, two hoppers mounted above the conveyer and a positively-driven reciprocating discharge device for each hopper, and means for reciprocating the discharge devices in unison, whereby each bucket is supplied with material from both hoppers and said material is thereby mixed, substantially as described.

3. The combination of a conveyer, two hoppers mounted above the conveyer, a discharge-carriage for each hopper so arranged as to discharge the material from the hopper into the conveyer, means for operating the said carriages, and means for adjusting the operating mechanism so that the proportion of material discharged into the conveyer from each hopper can be varied to make the proper mixture, substantially as described.

4. The combination of a conveyer, two hoppers, two independent discharge-carriages, one carriage controlling the flow of material from one hopper and the other carriage controlling the flow of material from the other hopper, a lever, means for vibrating said lever, and means whereby the two carriages may be independently connected to the lever, substantially as described.

5. The combination of a conveyer, two hoppers mounted above the conveyer, a reciprocating carriage mounted between each hopper and the conveyer, two levers, means for vibrating said levers, an adjustable block on each lever, a rod connecting the block on one lever with one carriage and the block on the other lever with the other carriage, and means for adjusting said blocks to regulate the extent of movement of each carriage, substantially as described.

6. The combination of a conveyer, a hopper, a reciprocating carriage mounted between the hopper and the conveyer, a pivoted lever, means for vibrating said lever, a block, a screw for adjusting said block, means for turning said screw, and a rod connecting the block with the carriage, substantially as described.

7. The combination of a conveyer, a hopper, a reciprocating discharge-carriage for the hopper, a pivoted lever, means for moving the said lever, an adjustable block on said lever, a rod connecting the block with the carriage, a screw for adjusting the block, a shaft at the pivot-point of the lever geared to the screw, and means for turning the shaft to move the block to or from the pivot-point of the lever to alter the movement of the carriage, substantially as described.

In testimony whereof we have signed our names to this specification in the presence of two subscribing witnesses.

JAMES M. DODGE.
ARTHUR D. SHAW.

Witnesses:
WILL. A. BARR,
JOS. H. KLEIN.